(12) United States Patent
Schrödinger

(10) Patent No.: US 7,234,879 B2
(45) Date of Patent: Jun. 26, 2007

(54) OPTICAL CONNECTOR

(75) Inventor: Karl Schrödinger, Berlin (DE)

(73) Assignee: Finisar Corporation, Sunnyvale, CA (US)

( * ) Notice: Subject to any disclaimer, the term of this patent is extended or adjusted under 35 U.S.C. 154(b) by 306 days.

(21) Appl. No.: 10/943,426

(22) Filed: Sep. 17, 2004

(65) Prior Publication Data

US 2006/0062527 A1 Mar. 23, 2006

(51) Int. Cl.
*G02B 6/36* (2006.01)
(52) U.S. Cl. .............................. 385/89; 385/76; 385/77; 385/78; 385/86; 385/88; 385/90; 385/92
(58) Field of Classification Search ............ 385/76–78, 385/86, 88–90, 92
See application file for complete search history.

(56) References Cited

U.S. PATENT DOCUMENTS 4,611,887 A * 9/1986 Glover et al. .................. 385/71

\* cited by examiner

*Primary Examiner*—Frank G. Font
*Assistant Examiner*—Michael P. Mooney
(74) *Attorney, Agent, or Firm*—Workman Nydegger

(57) ABSTRACT

The invention relates to an optical duplex connector which has two optical waveguides, a connector housing, in which the optical waveguides are arranged with a defined lateral spacing in relation to each other, and a triggering mechanism for locking and/or unlocking the optical connector with respect to a coupling partner. The triggering mechanism comprises at least one interacting part, which interacts with at least one corresponding part of the coupling partner for locking and/or unlocking. In this case, the at least one interacting part is arranged, with respect to the plugging direction, in the lateral region between the two optical waveguides or extends along this lateral region. This leads to a particularly compact connector structure.

19 Claims, 5 Drawing Sheets

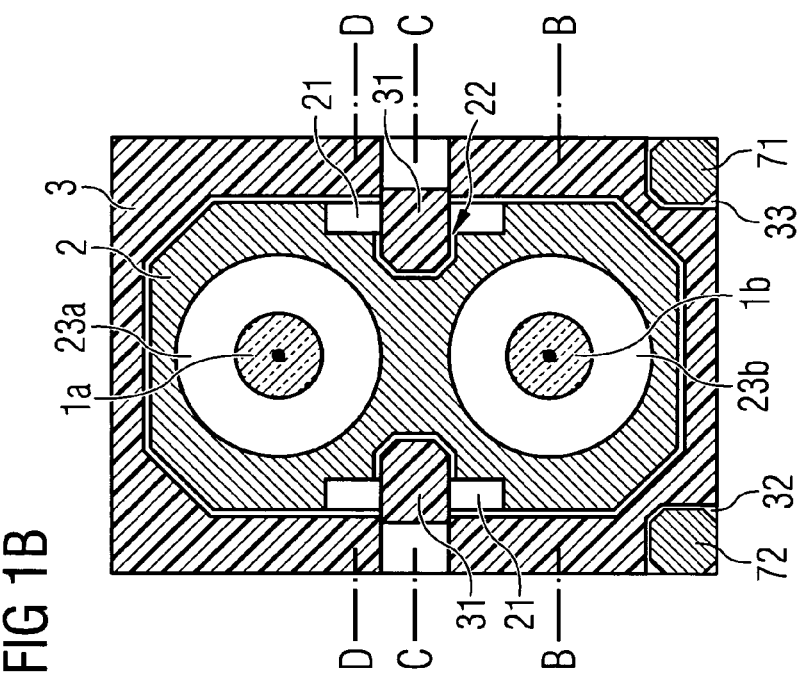
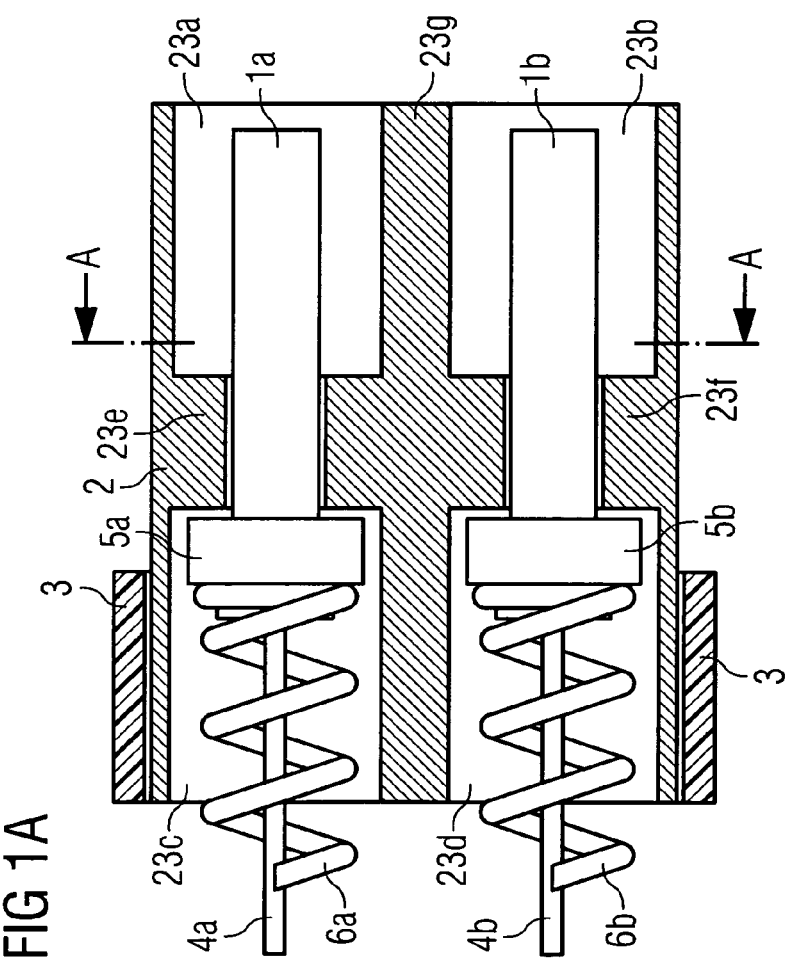

OPTICAL CONNECTOR

FIELD OF THE INVENTION

The invention relates to a compact optical duplex connector. In particular, the invention relates to a compact optical duplex connector for a reduced optoelectronic small-form-factor module (SFF/2—small-form-factor-half).

BACKGROUND OF THE INVENTION

Optical connectors provide releasable connections of optical waveguides in an optical communications system. They serve for example for the optical connection of an optical waveguide to a transmitter or receiver of an optoelectronic transceiver or for a coupling with a further optical waveguide.

A large number of standardized and commercially available optical connectors are known. Of these, small-form-factor (SFF) connectors have a particularly small form of construction and can be inserted into the optical port of what are known as small-form-factor (SFF) transceivers or small-form-factor-pluggable (SFP) transceivers of a small type of construction.

Two of the most popular SFF connectors are the LC connector and the MT-RJ connector. The LC connector has a ceramic pin with a diameter of 1.25 mm. The latching engagement is realized by an RJ-45 mechanism on one side. For the optical coupling to an optoelectronic SFF or SFP transceiver, it is envisaged to form an LC duplex connector from two LC simplex connectors by an interlocking means.

An MT-RJ connector has two glass fibers arranged with a spacing of 750 µm in a connector housing with an RJ-45 mechanism. Provided to the sides of the glass fibers are two guiding bores or two guiding pins.

It is endeavored to reduce the known SFF and SFP transceivers further in size, in particular to provide reduced SFF and SFP modules of half the width (SFF/2 and SFP/2 modules). Accordingly, there is also a demand for optical connectors which have an extremely compact structure and are suitable for coupling with such reduced SFF and SFP transceivers. So far, optical connectors of such a compact form of construction are not known.

SUMMARY OF THE INVENTION

The invention provides an optical connector which has two optical waveguides, a connector housing, in which the optical waveguides are arranged with a defined lateral spacing in relation to each other, and a triggering mechanism for locking and/or unlocking the optical connector with respect to a coupling partner, the triggering mechanism comprising at least one interacting part, which interacts with at least one corresponding part of the coupling partner for locking and/or unlocking. In this case, the at least one interacting part is arranged, with respect to the plugging direction, in the lateral region between the two optical waveguides or extends along this lateral region.

The solution according to the invention provides an optical connector in which the optical waveguides and the triggering mechanism for locking and unlocking the connector are arranged in a small space in a compact way. This is achieved in particular by the components responsible for the triggering mechanism for locking and/or unlocking the optical connector being formed in the region of the intermediate space between the two optical waveguides or extending along this region. The connector locking is in other words installed in a marginal region of the connector which lies at least partly in the region of the intermediate space between the two optical waveguides. This permits a particularly compact and space-saving arrangement of the individual components of the connector.

The solution according to the invention can in principle be used for any types of connector. A particularly preferred area of use lies in a further development of the currently known duplex LC connectors and MT-RJ connectors, the further development according to the present invention being based on the standardized connector pins (ferrules) and optical waveguide arrangements of these standards, and only the connector housing being modified.

In a preferred refinement of the invention, the connector housing is of a multipart form. It has a first housing part for bearing the optical waveguides and a second housing part, which can be displaced with respect to the first housing part. The second housing part is in this case part of the triggering mechanism or forms the latter. It is also preferably provided that the second housing part of the connector housing is displaceable in the longitudinal direction of the optical waveguides with respect to the first housing part between a first position and a second position, the optical connector being locked with respect to a coupling partner in the first position and unlocked with respect to a coupling partner in the second position.

In order to achieve this, in a preferred refinement the displaceable second housing part has at least one sloping coupling surface, which, when the second housing part is displaced between the first position and the second position, comes into contact with a locking element of a coupling partner and thereby deflects it perpendicularly in relation to the direction of the movement of the second housing part. In particular, the sloping coupling surface is advantageously formed in such a way that, when the second housing part is displaced into the second position, it presses the locking element of the coupling partner outward and makes it disengage from the connector housing.

The first housing part preferably has a groove, into which a radially resilient locking element of the coupling partner can engage. The second housing part and its sloping coupling surface have the effect that the radially resilient locking element is bent outward in the unlocking position, so that it disengages from the groove of the first housing part.

The second housing part preferably has at least one actuating arm extending in the direction of a coupling partner, the sloping coupling surface being formed on the actuating arm. The actuating arm in this case represents an interacting part of the triggering mechanism.

It is also preferably provided that the first housing part has a longitudinal groove and the actuating arm is longitudinally displaceable in the longitudinal groove of the first housing part. Two actuating arms of the second housing part, which extend on two opposite sides of the connector, are preferably provided, the actuating arms respectively being arranged in the lateral region between the two optical waveguides, as are the associated longitudinal grooves of the first housing part.

The width of the optical connector preferably lies between 6 and 6.8 mm, in particular at 6.4 mm. The height of the optical connector preferably lies between 8.2 and 9 mm, in particular at 8.6 mm. The width is consequently only half the width of the SFF connectors that are known in the prior art.

In a preferred refinement, the second housing part has recesses, which provide space for a device for locking the coupling partner with respect to a printed circuit board. Such a device is, for example, an actuating clip, which has two parallel-running wire clips and with the aid of which a pluggable optoelectronic transceiver can be pushed into a housing on a host printed circuit board and locked. The second housing part preferably has at its lower, lateral ends two recesses for two wires of such a wire clip. By providing corresponding recesses in the second housing part, it is ensured that insertion and removal of the optical connector does not impinge on existing locking of the transceiver.

BRIEF DESCRIPTION OF THE DRAWINGS

The invention is explained in more detail below on the basis of several exemplary embodiments with reference to the figures, in which:

FIG. 1A shows a cross section through a novel duplex LC connector according to the present invention, FIG. 1B shows a section through the duplex connector of FIG. 1A along the line A—A.

DESCRIPTION OF SEVERAL PREFERRED EXEMPLARY EMBODIMENTS

Figure 1C:
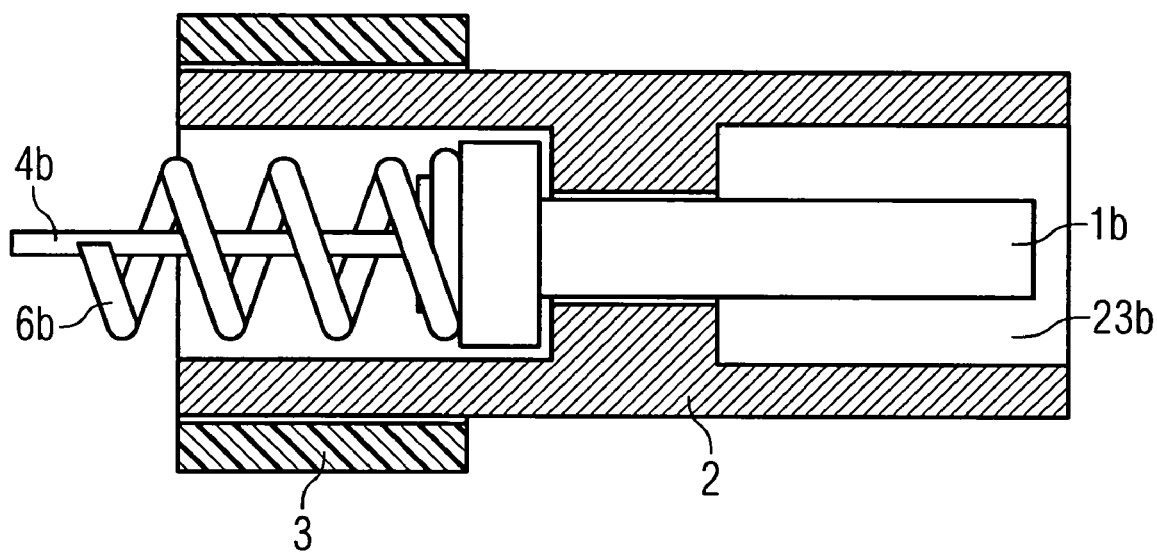
FIG. 1C shows a section through the duplex connector of FIGS. 1A, 1B along the line B—B of FIG. 1B.

FIGS. 1A to 1D show an optical connector, which has, as significant parts, two connector pins 1a, 1b, a first housing part 2, a second housing part 3, two pin holders 5a, 5b and two mechanical springs 6a, 6b.

The connector pins 1a, 1b are ferrules made for example of ceramic or plastic with a diameter of 1.25 mm, in each of which an optical fiber 4a, 4b is centrally arranged. The lateral spacing of the two connector pins 1a, 1b is preferably about 4 mm.

The first housing part 2 represents a pin bearing and serves for receiving and bearing the connector pins 1a, 1b. For this purpose, the first housing part has two front recesses 23a, 23b, two rear recesses 23c, 23d and a guiding region 23e, 23f respectively lying in between. The first housing part 2 additionally extends in a region 23g between the two connector pins 1a, 1b.

Arranged in the front recesses 23a, 23b are the two connector pins 1a, 1b. To protect them from unintentional damage, the end faces of the connector pins 1a, 1b are in this case set back from the edge of the first housing part 2. The rear recesses 23c, 23d serve for receiving the pin holders 5a, 5b and also the springs 6a, 6b. In a way known per se, when there is optical coupling with a coupling partner a pressing pressure on the end faces of the connector pins 1a, 1b is provided by means of the pin holders 5a, 5b and the springs 6a, 6b.

It is pointed out that the pin holders 5a, 5b and the springs 6a, 6b are only schematically represented. It is also pointed out that the optical connector additionally has a cable strain relief (not represented), which passes on tensile loads of the optical cable via the connector housing to a coupling or a device housing. The optical connector also has an anti-kink sleeve (not represented). Corresponding cable strain reliefs and anti-kink sleeves are known to a person skilled in the art, so are not discussed any further here.

The second housing part 3 provides a triggering mechanism for locking and unlocking the optical connector with respect to a coupling partner. It is in this case provided that the second housing part 3 surrounds the first housing part 2 on its outer side and is displaceable with respect to the first housing part 2, to be precise in the direction of the longitudinal axis of the connector pins 1a, 1b.

Figure 1D:
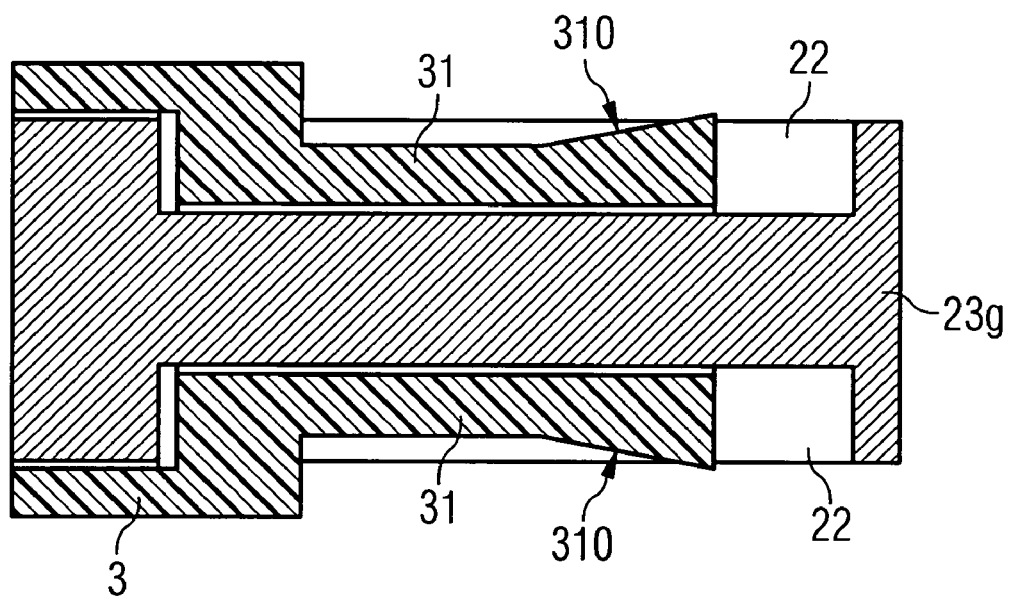
FIG. 1D shows a section through the duplex connector of FIGS. 1A, 1B along the line C—C of FIG. 1B.

Further details, in particular with respect to the formation of the first housing part 2 and the second housing part 3, can be taken from sectional representations of FIGS. 1B to 1D. As FIG. 1B reveals, the first housing part 2 has in the lateral region between the two connector pins 1a, 1b a transverse groove 21 on two opposite sides. This transverse groove 21 serves for receiving a latching element of a coupling partner, as still to be explained on the basis of FIG. 2. FIGS. 1B and 1D further reveal that the second housing part 3 has in the lateral region between the two connector pins 1a, 1b two actuating arms 31, which extend in the direction of a coupling partner and respectively form at their ends a sloping coupling surface 310. The actuating arms 31 run in two longitudinal grooves 22 of the first housing part 2. In this case, the second housing part 3 is longitudinally displaceable with the actuating arms 31 between a first position and a second position, the first position and the second position being defined by the ends of the longitudinal groove 22.

Also provided on the second housing part 3, in the lower region, are rectangular recesses 32, 33, which make it possible to accommodate an actuating element for the insertion of an SFP transceiver (which then represents the coupling partner) into a housing arranged on a printed circuit board, and consequently is not disturbed, and in particular not inadvertently actuated, during the plugging-in and unplugging of the optical connector. The actuating element for the SFP transceiver is formed for example by a metal clip, which has two parallel-running metal wires 71, 72. The rectangular recesses 32, 33 at the lower edge of the second housing part 3 serve for receiving such metal wires 71, 72.

FIGS. 2 and 3 show not only the optical connector according to FIGS. 1A to 1D but also a schematically represented coupling partner 8. The coupling partner 8 is, for example, a reduced optoelectronic SFF/2 or SFP/2 transceiver with a transmitting module and a receiving module, light emitted by the transmitting module being coupled into one of the optical waveguides of the optical connector and the light to be received by the receiving module being coupled out from the other optical waveguide of the optical connector. The coupling partner 8 has for this purpose a schematically represented connector receptacle 82, which is also referred to as the receptacle, optical port or flange. The connector receptacle 82 serves for receiving the optical connector and coupling the connector pins or the optical waveguides contained in them with the transmitting component and the receiving component of the transceiver. The optical interface is not represented in any more detail.

The coupling partner 8 also has a locking mechanism 81, which permits a latchable connection of the optical connector to the coupling partner 8. In the exemplary embodiment represented, the locking mechanism is formed by two protruding locking arms 81 respectively with a detent 810. As the sectional representations of FIGS. 2A, 2B reveal, in the locked state the detent 810 is in engagement with the transverse groove 21 of the first housing part 2. In the locked state, the displaceable second housing part 3, and in particular its actuating arm 31, are in the locking position, i.e. the actuating arm 31 has been displaced in the direction of the actuating element 8.

Figure 2A:
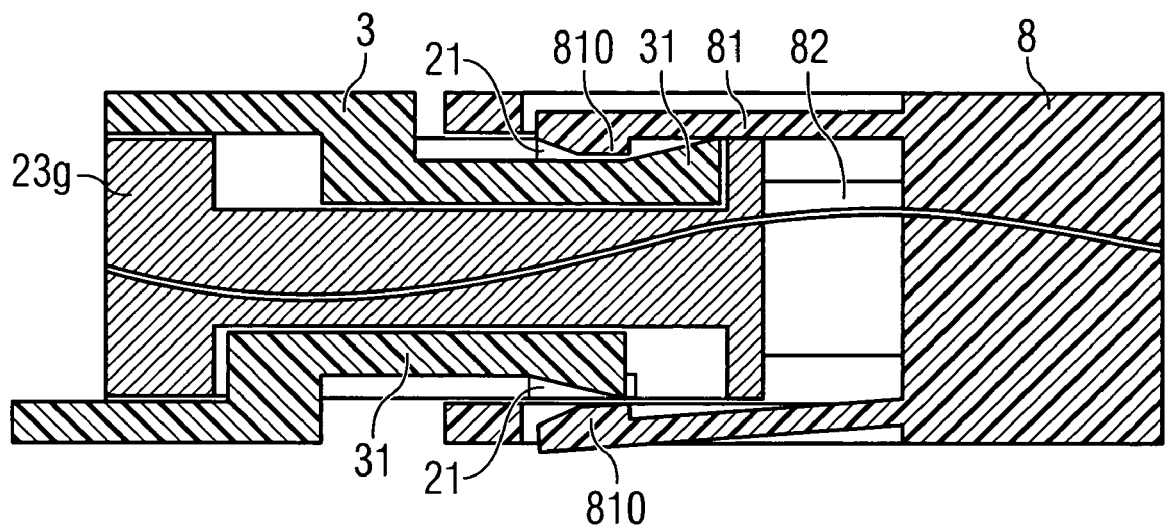
FIG. 2A shows a section through an arrangement which comprises on the one hand the duplex connector of FIGS. 1A to 1D and on the other hand a coupling partner of the connector, the section being taken through the line C—C of FIG. 1B, and the upper half of the representation representing the locked state and the lower half of the representation representing the unlocked state between the coupling partners.
Figure 2B:
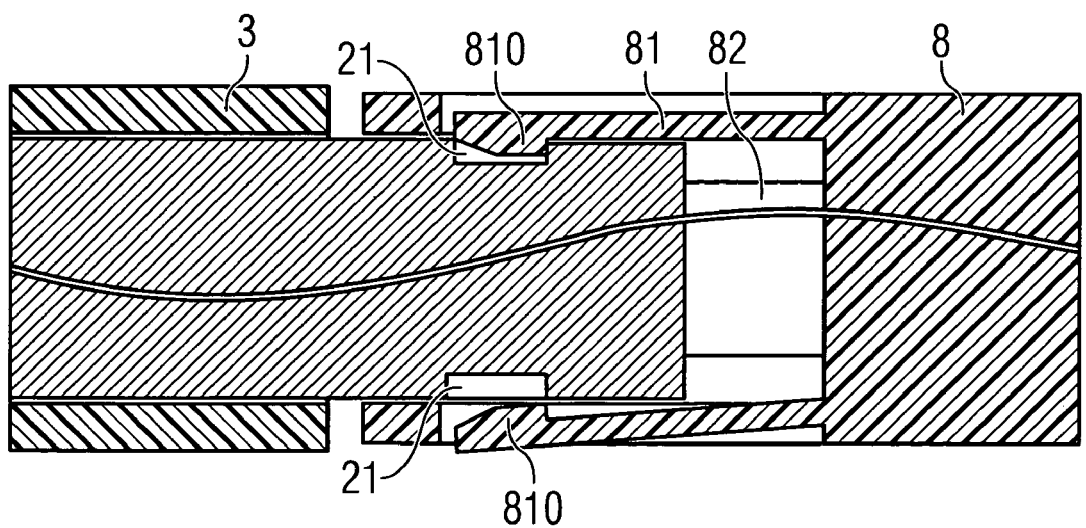
FIG. 2B shows a representation corresponding to FIG. 2A, the section being taken through the line D—D of FIG. 1B.

The respectively lower representations, separated by an S line, of FIGS. 2A, 2B show the unlocked state. In the unlocked state, the second housing part 3 has been displaced into the unlocking position. As this happens, the sloping coupling surface 310 of the actuating arm 31 presses the respectively associated detent 810 of the locking arm 81 of the coupling partner 8 outward, so that unlocking is obtained.

Figure 3A:
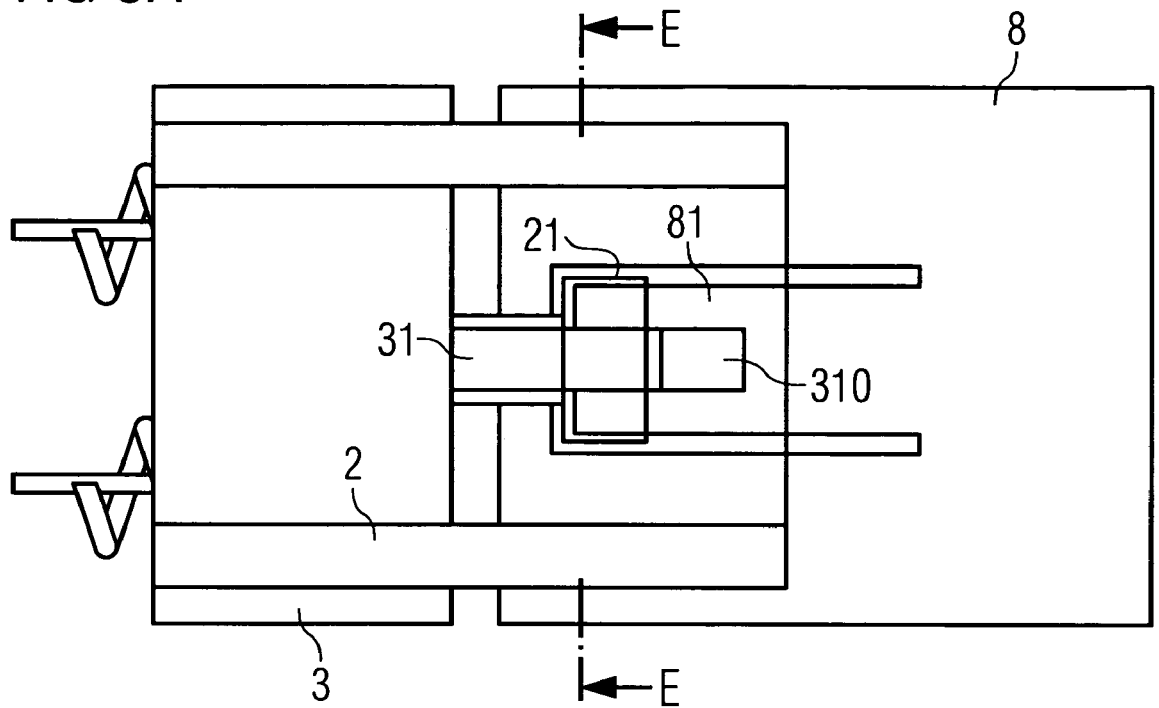
FIG. 3A shows the arrangement of FIGS. 2A, 2B in plan view, with an optical connector according to FIGS. 1A to 1D and an associated coupling partner.

FIG. 3A shows the arrangement from above, revealing in particular the locking arm 81 of the coupling partner 8, the transverse groove 21 of the first housing part, into which the detent 810 of the locking arm 81 protrudes in the locked state, and the actuating arm 31 with the sloping coupling surface 310 of the second housing part 3. The coupling partner 8, which, as already mentioned, is preferably an SFF/2 or SFP/2 transceiver module of a particularly small type of construction, is in turn merely schematically represented.

Figure 3C:
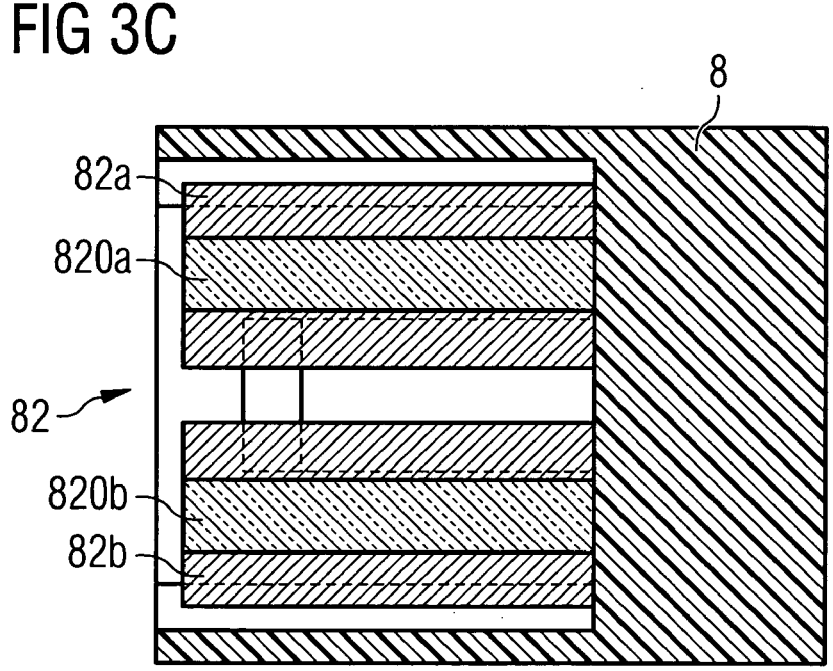
FIG. 3C shows a section through the arrangement of FIGS. 3A, 3B along the line F—F of FIG. 3B
Figure 3B:
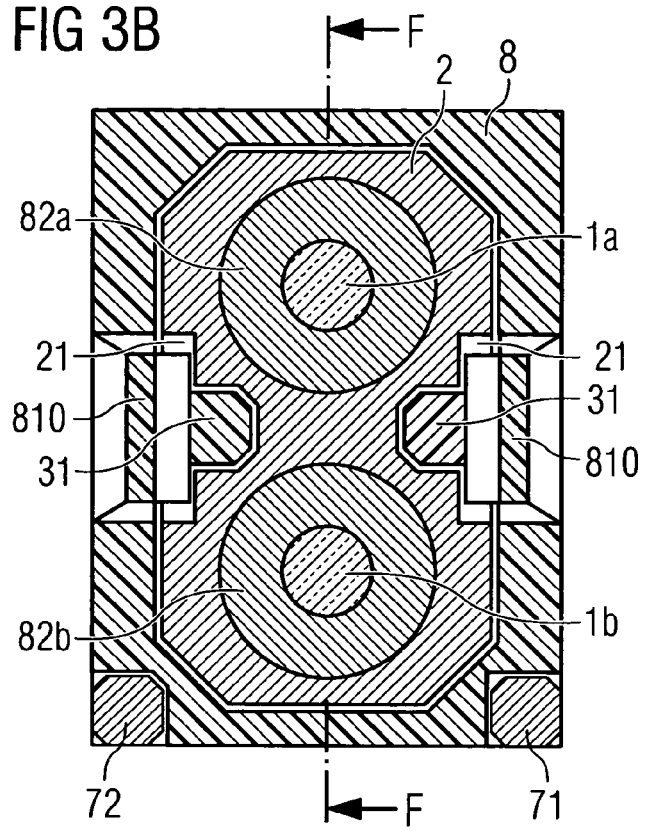
FIG. 3B shows a section through the arrangement of FIG. 3A along the line E—E.

FIG. 3C shows additional details of the connector receptacle 82 without the connector, corresponding to the section F—F of FIG. 3B. This has two receptacles 82a, 82b with receiving openings 820a, 820b. When the two connector pins 1a, 1b are inserted in the receptacles 82a, 82b, the end faces of the connector pins 1a, 1b and of the optical waveguides arranged in them are positioned in such a way that ideal coupling with an optical transmitting module and an optical receiving module of the optoelectronic transceiver can take place. The corresponding coupling optics are not represented in any more detail here.

The sectional representation of FIG. 3B represents the latching situation. The first housing part 2 has been inserted into the connector receptacle of the coupling partner 8. The connector pins 1a, 1b are located in the corresponding receptacles. 82a, 82b of the connector receptacle 82. The detent 810 of the locking arm 81 is in latching engagement in the transverse groove 21 of the first housing part 2. The actuating arm 31 is in the locking position.

It follows from the functionality described that the actuating arm 31 of the further housing part 3 forms an interacting part of the triggering mechanism formed by the two displaceable housing parts 2, 3, this interacting part interacting with at least one corresponding part (the locking arm 81) of the coupling partner 8 for locking and unlocking. In this case, the interacting part, i.e. the actuating arm 31, is arranged, with respect to the plugging direction, in the lateral region between the two optical waveguides or connector ferrules 1a, 1b, whereby a particularly compact structure is produced.

The width of the optical connector is preferably 6.4 mm, the height is preferably 8.6 mm, the lateral spacing of the connector pins (from center axis to center axis) is preferably 4 mm. This provides an optical connector of half the width of currently known LC duplex connectors.

Figure 4:
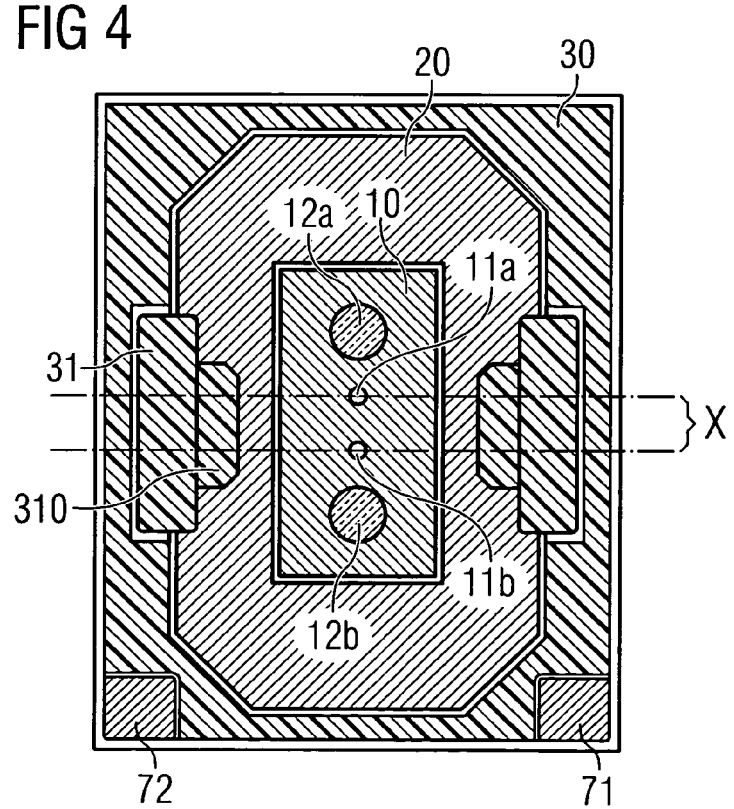
FIG. 4 shows a cross section through a novel MT-RJ connector according to the present invention.

FIG. 4 shows an alternative exemplary embodiment with a novel MT-RJ connector of a particularly compact and small type of construction, which can be used for SFF/2 or SFP/2 optoelectronic transceivers.

In a way similar to in the case of the exemplary embodiment of FIGS. 1 to 3, the duplex connector has a first housing part 20, serving as a pin bearing, and a second housing part 30, displaceable with respect to the first housing part 20, and also actuating arms 31 with sloping surfaces 310.

The first housing part 20 comprises a connector body 10, which contains two glass fibers 11a, 11b with a spacing of 750 μm. Furthermore, the connector body 10 comprises two high-precision guiding pins 12a, 12b or alternatively two high-precision guiding bores, depending on whether it is a male or female connector. The connector body 10 may also have a mini-MT ferrule (not represented in any more detail), which receives the two glass fibers 12a, 12b. The formation of the connector body 10 corresponds to the formation of known MT-RJ connectors.

It is pointed out that the actuating arms 31 of the second housing part 30 extend in the region X, identified by two dashed transverse lines, between the two optical waveguides 11a, 11b, and in the lateral region there. On account of the close spacing between the two optical waveguides 11a, 11b, the two actuating arms also extend beyond the region X.

The invention is not confined in its execution to the exemplary embodiments represented above. A person skilled in the art recognizes the existence of numerous alternative configurational variants which, in spite of their departure from the exemplary embodiments described, make use of the teaching defined in the claims which follow.

The invention claimed is:

1. An optical duplex connector comprising:
   two optical waveguides,
   a connector housing, in which the optical waveguides are arranged with a defined lateral spacing in relation to each other,
   a triggering mechanism for locking or unlocking the optical connector with respect to a coupling partner, the triggering mechanism comprising at least one interacting part, which interacts with at least one corresponding part of the coupling partner for locking or unlocking,
   the at least one interacting part being arranged, with respect to a plugging direction of the connector with respect to the coupling partner, in the lateral region at least partially between the two optical waveguides.

2. The optical connector according to claim 1, wherein the connector housing comprises a first housing part for bearing the optical waveguides and a second housing part, which is displaceable with respect to the first housing part, the triggering mechanism comprising the displaceable second housing part of the connector housing.

3. The optical connector according to claim 2, wherein the second housing part of the connector housing is displaceable in a longitudinal direction of the optical waveguides with respect to the first housing part between a first position and a second position, the optical connector being locked with respect to a coupling partner when the second housing part resides in the first position and unlocked with respect to a coupling partner when the second housing part resides in the second position.

4. The optical connector according to claim 3, wherein the displaceable second housing part comprises at least one sloping coupling surface, which, when the second housing part is displaced between the first position and the second position, comes into contact with a locking element of the coupling partner and thereby deflects it the locking element perpendicularly in relation to the direction of the movement of the second housing part.

5. The optical connector according to claim 4, wherein the sloping coupling surface is configured in such a way that, when the second housing part is displaced into the second position, the sloping coupling surface presses the locking element of the coupling partner outward and makes it disengage from the connector housing.

6. The optical connector according to claim 4, wherein the first housing part comprises a groove, into which a radially resilient locking element of the coupling partner engages when the second housing part is in the first position.

7. The optical connector according to claim 4, wherein the second housing part comprises at least one actuating arm extending in a direction of a coupling partner, wherein the sloping coupling surface is formed on the actuating arm.

8. The optical connector according to claim 7, wherein the first housing part comprises a longitudinal groove and wherein the actuating arm is longitudinally displaceable in the longitudinal groove of the first housing part between the first and second positions.

9. The optical connector according to claim 7, wherein the at least one actuating arm comprises two actuating arms of the second housing part, which extend on two opposite sides of the connector, the actuating arms respectively being arranged in the lateral region between the two optical waveguides.

10. The optical connector according to claim 1, the wherein a width of the optical connector is between 6 and 6.8 mm.

11. The optical connector according to claim 1, wherein a height of the optical connector is between 8.2 and 9 mm.

12. The optical connector according to claim 1, wherein the connector being formed as comprises an LC duplex connector.

13. The optical connector according to claim 12, wherein the connector housing comprises two connector pins with a diameter of 1.25 mm, in each of which an optical waveguide is arranged.

14. The optical connector according to claim 13, wherein the lateral spacing between the two connector pins is 4 mm.

15. The optical connector according to claim 1, wherein the connector housing is configured in accordance with the MT-RJ standard.

16. The optical connector according to claim 14, wherein the two optical waveguides be are arranged with a lateral spacing of 0.75 mm.

17. The optical connector according to claim 2, wherein the second housing part comprises recesses which provide space for a device for locking the coupling partner with respect to a printed circuit board.

18. An optical connector, comprising:
a first housing part comprising front recesses configured to accommodate optical connector pins therein, the first housing part further comprising lateral side surfaces extending parallel to a stacked orientation of the connector pins, the lateral side surfaces extending from a front face portion having the front recesses therein to a back face portion, wherein the lateral side surfaces further comprise a transverse groove between the front and back face, and wherein the lateral side surfaces further comprise a longitudinal groove extending generally perpendicularly to the transverse groove; and
a second housing part operably coupled and longitudinally displaceable with respect to the first housing part along the longitudinal grooves thereof between a first position and a second position, wherein the second housing part is configured to permit receipt of the locking mechanism into the transverse grooves in the first position, and effectuate a removal of the locking mechanism from the transverse grooves in the second position, thereby unlocking the coupling partner from the optical connector.

19. The optical connector of claim 18, wherein the second housing part further comprises a sloping coupling surface configured to substantially not engage the locking mechanism when in the first position, and further configured to incrementally engage the locking mechanism as the second housing part travels from the first position to the second position along the longitudinal groove, thereby removing the locking mechanism from the transverse grooves when the second housing part is in the second position.

* * * * *

UNITED STATES PATENT AND TRADEMARK OFFICE
CERTIFICATE OF CORRECTION

PATENT NO. : 7,234,879 B2  Page 1 of 1
APPLICATION NO. : 10/943426
DATED : June 26, 2007
INVENTOR(S) : Karl Schrodinger It is certified that error appears in the above-identified patent and that said Letters Patent is hereby corrected as shown below:

Column 6
Line 18, change "12a, 12b" to --11a, 11b--

Column 7
Line 2, after "deflects", remove [it]
Line 30, after "claim 1,", remove [the]

Signed and Sealed this

Ninth Day of March, 2010

David J. Kappos
*Director of the United States Patent and Trademark Office*